US010340735B2

(12) United States Patent
Yoo et al.

(10) Patent No.: US 10,340,735 B2
(45) Date of Patent: Jul. 2, 2019

(54) METHOD AND APPARATUS FOR OPTIMAL RESOURCE ALLOCATION BASED ON CONTRIBUTION MARGIN RATIO

(71) Applicant: Electronics and Telecommunications Research Institute, Daejeon (KR)

(72) Inventors: Yoon Sik Yoo, Daejeon (KR); Il Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 109 days.

(21) Appl. No.: 15/589,574

(22) Filed: May 8, 2017

(65) Prior Publication Data

US 2017/0324276 A1    Nov. 9, 2017

(30) Foreign Application Priority Data

May 9, 2016   (KR) .................. 10-2016-0056505
Feb. 1, 2017   (KR) .................. 10-2017-0014442

(51) Int. Cl.
| | | |
|---|---|---|
| G05D 3/12 | (2006.01) | |
| H02J 13/00 | (2006.01) | |
| H02J 3/00 | (2006.01) | |

(52) U.S. Cl.
CPC .......... *H02J 13/0062* (2013.01); *H02J 3/005* (2013.01); *H02J 2003/003* (2013.01);
(Continued)

(58) Field of Classification Search
CPC ........................................................ H02J 3/14
(Continued)

(56) References Cited

U.S. PATENT DOCUMENTS 8,978,225 B2 *  3/2015  James ............... E01F 15/0461
                                                29/413
2004/0236857 A1 * 11/2004 Roy ..................... G06F 9/5044
                                                709/229
(Continued)

FOREIGN PATENT DOCUMENTS

| CN | 104318336 A | 1/2015 |
| KR | 1020150113807 A | 10/2015 |
| KR | 1020150136171 A | 12/2015 |

OTHER PUBLICATIONS

Pedrasa et al, Coordinated Scheduling of Residential Distributed Energy Resources to Optimize Smart Home Energy Service, Sep. 2010, pp. 18 (Year: 2010).*

(Continued)

*Primary Examiner* — Suresh Suryawanshi
(74) *Attorney, Agent, or Firm* — William Park & Associates Ltd.

(57) ABSTRACT

A method and apparatus for optimally allocating resources of a provider according to a contribution margin ratio of a resource consumer in a distributed energy resource environment are described. An embodiment is a method for distributing energy resources in a distributed energy resource system. The method may include receiving information about the amount of available energy resources from each of one or more providers, receiving information about the amount of required energy resources from each of one or more consumers, assessing a contribution margin ratio for each of the one or more consumers, calculating an energy resource allocation amount for each of the one or more consumers based on the assessed contribution margin ratio, and distributing energy resources to each of the one or more consumers based on the calculated energy resource allocation amount.

10 Claims, 7 Drawing Sheets

(52) U.S. Cl.
CPC ....... *Y02B 70/3216* (2013.01); *Y02E 60/7838* (2013.01); *Y04S 20/221* (2013.01); *Y04S 40/124* (2013.01)

(58) Field of Classification Search
USPC ........................................................ 700/295
See application file for complete search history.

(56) References Cited

U.S. PATENT DOCUMENTS

| | | | |
|---|---|---|---|
| 2012/0150679 A1* | 6/2012 | Lazaris .............. | G06Q 30/0605 705/26.2 |
| 2013/0166479 A1 | 6/2013 | Hwang et al. | |
| 2013/0218356 A1 | 8/2013 | Lee et al. | |
| 2014/0277797 A1 | 9/2014 | Mokhtari et al. | |
| 2015/0301546 A1* | 10/2015 | Hornor .................. | H02J 3/008 700/295 |
| 2018/0034312 A1* | 2/2018 | Abdulla .................... | H02J 7/35 |

OTHER PUBLICATIONS

Wang et al, Review of real-time electricity markets for integrating Distributed Energy Resources and Demand Response, Jan. 2015, pp. 695-706 (Year: 2015).*

Yoo, Yoon-Sik et al., "Energy Optimal Management for Prioritized Distribution in Smart Grid," Information and Communication Technology Convergence (ICTC), Oct. 19-21, 2016, IEEE, Jeju, Republic of Korea.

* cited by examiner

METHOD AND APPARATUS FOR OPTIMAL RESOURCE ALLOCATION BASED ON CONTRIBUTION MARGIN RATIO

CROSS-REFERENCE TO RELATED APPLICATIONS

This application claims the benefits of Korean Patent Application No. 10-2016-0056505, filed on May 9, 2016, and Korean Patent Application No. 10-2017-0014442, filed on Feb. 1, 2017, both of which are hereby incorporated by reference as if fully set forth herein.

BACKGROUND

Technical Field

The present disclosure relates to resource allocation, and more particularly, to a method and apparatus for optimally allocating resources of a provider according to a contribution margin ratio of a resource consumer in an environment in which energy resources are distributed.

Related Art

In general, energy resources (e.g., power, heat, and light) are provided in an environment where a resource provider is remote from final consumers (or accommodators) and a large volume of energy resources produced in a large-scale facility are provided to a large number of final consumers through branch lines. Beyond the typical energy resource-providing scheme, a distributed energy resource environment has recently been considered. The distributed energy resource environment may refer to an environment in which each of a plurality of providers provides a small volume of energy resources or an environment in which a plurality of energy resource providers are located near to final consumers.

In this distributed energy resource environment, energy resources may be provided or consumed through an energy resource exchange (e.g., a power exchange). For example, the energy resource exchange may allocate energy resources requested by a consumer based on a single distributed resource or by mapping a single energy resource provider to the consumer in a one-to-one correspondence. However, a shortcoming of the distributed energy resource allocation scheme is that distributed energy resources cannot be allocated optimally.

Accordingly, there is a need for more efficiently allocating distributed energy resources in an environment in which energy resources are used for various purposes, different types of energy resources are provided and consumed, a large number of energy resource providers are distributed across a broad area, and energy resource providers are also energy resource consumers.

SUMMARY

The present disclosure describes embodiments of a method and apparatus for optimally allocating energy resources based on a contribution margin ratio of a consumer.

The present disclosure also describes embodiments of a method and apparatus for optimally allocating multi-purpose, heterogeneous, and distributed energy resources to a consumer.

The present disclosure also describes embodiments of a method and apparatus for trading energy resources in a manner that increases the availability of distributed energy resources.

The present disclosure also describes embodiments of a method and apparatus for efficiently managing and providing distributed energy resources.

The embodiments contemplated by the present disclosure are not limited to the foregoing descriptions, and additional embodiments will become apparent to those having ordinary skill in the pertinent art to the present disclosure based upon the following descriptions.

In an aspect of the present disclosure, a method for distributing energy resources in a distributed energy resource system may include receiving information about the amount of available energy resources from each of one or more providers, receiving information about the amount of required energy resources from each of one or more consumers, assessing a contribution margin ratio for each of the one or more consumers, calculating an energy resource allocation amount for each of the one or more consumers based on the assessed contribution margin ratio, and distributing energy resources to each of the one or more consumers based on the calculated energy resource allocation amount.

In another aspect of the present disclosure, an apparatus for distributing energy resources in a distributed energy resource system may include a transceiver, and a processor. The processor may be configured to receive information about the amount of available energy resources from each of one or more providers through the transceiver, to receive information about the amount of required energy resources from each of one or more consumers through the transceiver, to assess a contribution margin ratio for each of the one or more consumers, to calculate an energy resource allocation amount for each of the one or more consumers based on the assessed contribution margin ratio, and to transmit information about energy resources to be distributed to each of the one or more consumers based on the calculated energy resource allocation amount.

In another aspect of the present disclosure, a method for requesting energy resources by a consumer device in a distributed energy resource system may include transmitting, to an energy allocation apparatus, information about the amount of energy resources requested by the consumer device, and receiving, from the energy allocation apparatus, information about an energy resource allocation amount calculated based on a contribution margin ratio of the consumer device by the energy allocation apparatus.

In another aspect of the present disclosure, a consumer device for requesting energy resources in a distributed energy resource system may include a transceiver, and a processor. The processor may be configured to determine energy resources requested for the consumer device, to transmit information about the amount of the requested energy resources to an energy allocation apparatus through the transceiver, and to receive, from the energy allocation apparatus, information about an energy resource allocation amount calculated based on a contribution margin ratio of the consumer device by the energy allocation apparatus through the transceiver.

In various aspects of the present disclosure, the contribution margin ratio of one consumer may be a ratio of a contribution margin of the consumer to a total contribution margin of the one or more consumers.

In various aspects of the present disclosure, the contribution margin of the consumer may be determined based on at least one of the amount of energy resources provided by the consumer, the amount of energy resources used by another consumer among the energy resources provided by the consumer, distances between the consumer and the one or more providers, or a distance between the consumer and another consumer.

In various aspects of the present disclosure, the calculation of an energy resource allocation amount may include calculating the energy resource allocation amount for each of the one or more consumers, the energy resource allocation amount maximizing satisfaction levels of all of the one or more consumers.

In various aspects of the present disclosure, a satisfaction level of an $i^{th}$ consumer among the one or more consumers may be calculated by $$U_i(E_i) = \zeta_i^{\frac{1}{\omega}} \log\left(1 + \frac{E_i}{\omega \tau_i}\right)$$

where $U_i(E_i)$ represents the satisfaction level of the $i^{th}$ consumer when the $i^{th}$ consumer receives as much energy resources as $E_i$, $M_i^n$ represents a contribution margin of the $i^{th}$ consumer, η represents a weight factor, and $r_i$ represents the amount of energy resources requested by the $i^{th}$ consumer.

In various aspects of the present disclosure, if the calculated energy resource allocation amount for the $i^{th}$ consumer is $E_i^*$, and $0<E_i^*<r_i$, $E_i^*=\delta M_i^n-r_i$ and δ may be a predetermined value.

In various aspects of the present disclosure, if $E_i^* \geq r_i$, an optimal energy resource allocation amount for the $i^{th}$ consumer may be $r_i$.

In various aspects of the present disclosure, a satisfaction level of an $i^{th}$ consumer among the one or more consumers may be calculated by $$U_i(E_i) = \zeta_i^{\frac{1}{\omega}} \log\left(1 + \frac{E_i}{\omega \tau_i}\right)$$

where $U_i(E_i)$ represents the satisfaction level of the $i^{th}$ consumer when the $i^{th}$ consumer receives as much energy resources as $E_i$, $\zeta_i^{1/\omega}$ represents a contribution margin of the $i^{th}$ consumer, determined in consideration of an adjacent proximity level of the $i^{th}$ consumer, ω represents a weight factor based on a distance between the $i^{th}$ consumer and another consumer, and $\tau_i$ represents the amount of energy resources requested by the $i^{th}$ consumer.

In various aspects of the present disclosure, if the calculated energy resource allocation amount for the $i^{th}$ consumer is $E_i^*$, and $0<E_i^*<\tau_i$, $E_i^*=\zeta_i^{1/\omega}/v-\omega\tau_i$ and v may be a predetermined value.

In various aspects of the present disclosure, if $E_i^* \geq \tau_i$, an optimal energy resource allocation amount for the $i^{th}$ consumer may be $\tau_i$.

It is to be understood that both the foregoing summarized features are exemplary aspects of the following detailed description of the present disclosure without limiting the scope of the present disclosure.

According to the present disclosure, a method and apparatus for optimally allocating energy resources based on a contribution margin ratio of a consumer can be provided.

According to the present disclosure, a method and apparatus for optimally allocating multi-purpose, heterogeneous, and distributed energy resources to a consumer can be provided.

According to the present disclosure, a method and apparatus for trading energy resources in a manner that increases the availability of distributed energy resources can be provided.

According to the present disclosure, a method and apparatus for efficiently managing and providing distributed energy resources can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Embodiments of the present disclosure will be described in detail with reference to the attached drawings so that those skilled in the art may readily implement the present disclosure. The present disclosure may be realized in different ways, not limited to the embodiments as set forth herein.

Lest it should obscure the subject matter of the present disclosure, a known structure or function will not be described herein in detail. Parts having no relation to the description of the present disclosure are not shown, and like reference numerals denote the same components in the drawings.

In the present disclosure, when it is said that a component is "connected", "combined", or "coupled" with another component, it may cover an indirect connection relationship involving a third component in between as well as a direct connection relationship. Further, when it is said that a component "includes" or "has" another component, this means that any other component may further be included, not excluding other components, unless otherwise specified.

In the present disclosure, the term, first or second is used just to distinguish one component from another component, not limiting the sequence or importance of the components, unless otherwise specified. Therefore, a first component in an embodiment may be referred to as a second component in another embodiment, and a second component in an embodiment may be referred to as a first component in another embodiment, without departing from the scope of the present disclosure.

In the present disclosure, components are differentiated to clarify their features, not meaning that the components are necessarily separated. That is, a plurality of components may be integrated into one hardware or software unit, or one component may be distributed as a plurality of hardware or software units. Accordingly, although not stated specifically, the integrated or distributed embodiment also falls within the scope of the present disclosure.

In the present disclosure, components described in various embodiments are not always mandatory, and a part of the components may be optional. Therefore, an embodiment comprising a subset of the components described in an embodiment also falls within the scope of the present disclosure. Further, an embodiment including any other component in addition to components described in various embodiments also falls within the scope of the present disclosure.

Terms as used in the present disclosure are defined as follows.

Energy resource: tradable energy such as power and heat. Unless confused, an energy resource may be expressed just as a "resource".

Consumer: an entity consuming an energy resource. In the present disclosure, it is assumed that a consumer is a potential prosumer. That is, an entity called consumer may be an entity that only consumes energy resources without providing energy resources in one aspect, or an entity that has the features of both energy resource consumption and energy resource providing but operates as a consumer in a special case in another aspect of the present disclosure.

Provider: an entity that provides energy resources. In the present disclosure, it is assumed that a provider is a potential prosumer. That is, an entity called provider may be an entity that only provides energy resources without consuming energy resources in one aspect, or an entity that has the features of both energy resource consumption and energy resource providing but operates as a provider in a special case in another aspect of the present disclosure.

Contribution margin: a degree of contribution to providing energy resources. For example, the contribution margin of a consumer may be determined by various factors including the amount of energy resources provided by the consumer, the amount of energy resources used by other user(s) out of the provided energy resources, the distance(s) between the consumer and a provider(s) or between the consumer or the other user(s), and so on.

Contribution margin ratio: the proportion of the contribution margin of a specific consumer in the total contribution margin of a plurality of consumers requesting energy resources.

In regards to the foregoing definitions of the terms, the scope of the present disclosure is not limited to a specific type of energy resources. For example, while examples of the present disclosure are described in the context of power energy allocation, this should not be construed as limiting the present disclosure. Thus, examples of heat energy allocation may also be included in the scope of the present disclosure.

Now, a description will be given of a method for optimally allocating distributed energy resources according to the present disclosure. The method for optimally allocating distributed energy resources according to the present disclosure includes providing energy resources in consideration of the contribution margin ratio of a consumer. That is, if a consumer requests energy resources, energy resources may be provided to the consumer in consideration of information about contribution of the consumer to providing energy resources. For example, energy resources provided by a consumer may increase the contribution margin ratio of the consumer by as much energy resources as allocated to or used for other consumers. Thus, more energy resources may be provided to a consumer having a relatively high contribution to providing energy resources than other consumers.

The method for optimally allocating distributed energy resources according to the present disclosure may include assessing the contribution margin ratio of a consumer, managing the contribution margin ratio history of the consumer, calculating the amount of energy resources to be allocated to the consumer in consideration of the contribution margin ratio of the consumer, and awarding an incentive to a provider that provides energy resources according to the contribution of the provider.

Figure 1:
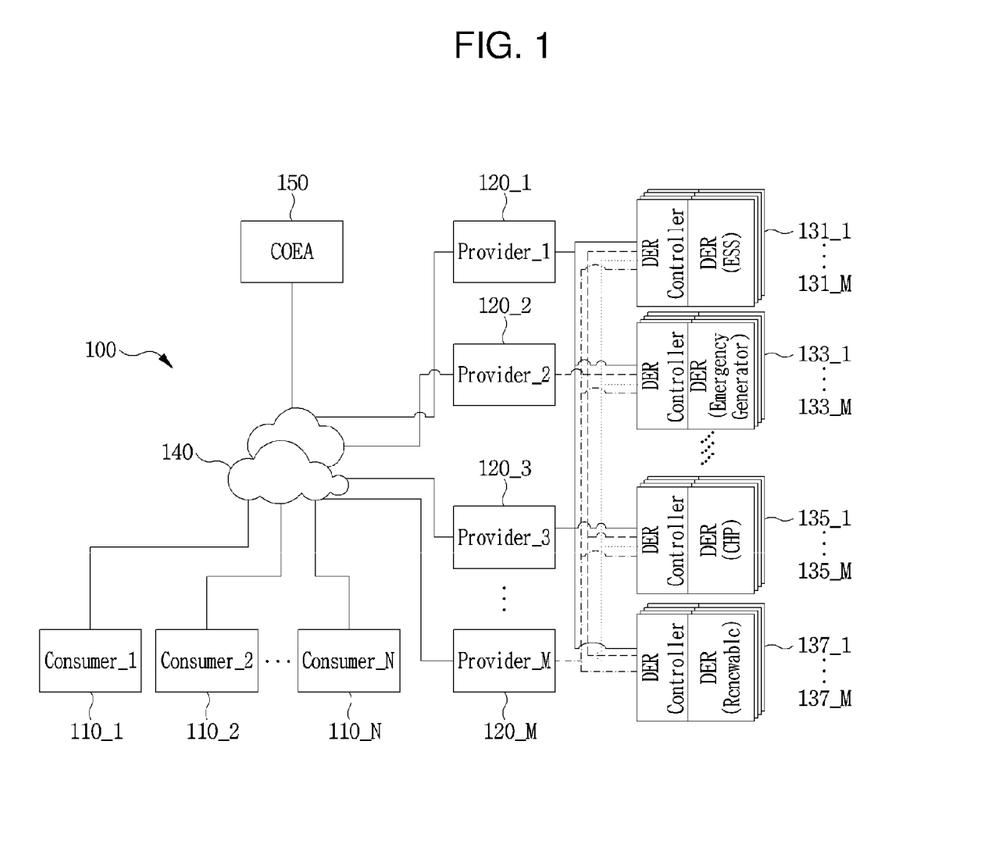
FIG. 1 is a diagram depicting a system including an apparatus for optimally allocating distributed energy resources according to the present disclosure.

FIG. 1 is a diagram depicting a system including an apparatus for optimally allocating distributed energy resources according to the present disclosure.

In the example of FIG. 1, the system includes a consumer 110 that wants to use distributed energy resources by requesting required energy, a provider 120 that requests registration of available distributed energy resources, distributed energy resource (DER) controllers 131, 133, 135, and 137 that manage and control distributed energy resources, the Internet 140 that provides communication paths among the entities illustrated in FIG. 1, and a contribution-margin optimal energy allocation (COEA) device 150 that manages optimal energy allocation of distributed energy resources registered by providers based on the contribution margin ratio of a consumer.

The system illustrated in FIG. 1 may include one or more consumers 110_1, 110_2, . . . , 110_N, and one or more providers 120_1, 120_2, . . . , 120_M. For example, this system may be a smart grid system, which should not be construed as limiting the scope of the present disclosure.

In the example of FIG. 1, each of one or more consumers may be called an $n^{th}$ consumer 110_N, and it may be assumed that up to N consumers exist in one system. That is, n=1, 2, . . . , N. Herein, N is not limited to 2 or larger, and the present disclosure may also cover a case where N=1.

Similarly, each of one or more providers may be called an $m^{th}$ provider 120_m, and it may be assumed that up to M providers exist in one system. That is, m=1, 2, . . . , M. Herein, M is not limited to 2 or larger, and the present disclosure may cover a case where M=1.

Each of the one or more consumers 110_1, 110_2, . . . , 110_N may request required energy resources to the system, and receive optimally allocated energy resources from the system.

A DER controller may be provided to a provider. The DER controller may be a renewable type, a combined heat and power (CHP) type, an emergency generator type, or an energy storage system (ESS) type according to a DER production type. That is, since use of the same control scheme for different DER production types is inefficient, a control scheme suitable for each DER production type may be applied. The scope of the present disclosure may include application of a DER controller for different DER production types or different DER types, not limited to the exemplary DER production types.

Further, one provider may produce distributed energy resources of heterogeneous DER production types. For example, energy resources produced according to the ESS, emergency generator, CHP, and renewable types by the $m^{th}$ provider 120_m may be controlled respectively by DER controllers 131_m, 133_m, 135_m, and 137_m.

DER controllers 131_1, ..., 131_M, 133_1, ..., 133_M, 135_1, ..., 135_M, 137_1, ..., 137_M may support registration of available energy resources to the system, from among energy resources produced by the one or more providers 120_1, 120_2, ..., 120_M.

The DER controllers 131_1, ..., 131_M, 133_1, ..., 133_M, 135_1, ..., 135_M, 137_1, ..., 137_M may also support providing of the available distributed energy resources of the one or more providers 120_1, 120_2, ..., 120_M to the one or more consumers 110_1, 110_2, ..., 110_N.

The COEA device 150 may manage distributed energy resources registered by the one or more providers 120_1, 120_2, ..., 120_M so that the distributed energy resources may be optimally allocated or distributed to the one or more consumers 110_1, 110_2, ..., 110_N according to their contribution margin ratios.

The COEA device 150 may communicate with the one or more consumers 110_1, 110_2, ..., 110_N, the one or more providers 120_1, 120_2, ..., 120_M, and the DER controllers 131_1, ..., 131_M, 133_1, ..., 133_M, 135_1, ..., 135_M, 137_1, ..., 137_M through the Internet 140.

In the example of FIG. 1, any of the one or more consumers 110_1, 110_2, ..., 110_N may be the same entity as one of the one or more providers 120_1, 120_2, ..., 120_M. That is, a consumer is an entity that requests allocation of energy resources in a specific situation or at a specific time, not an entity that always requests energy resources in the example of FIG. 1. In other words, the consumer may be a provider that registers its available distributed energy resources to the system in a different situation or at a different time.

Figure 2:
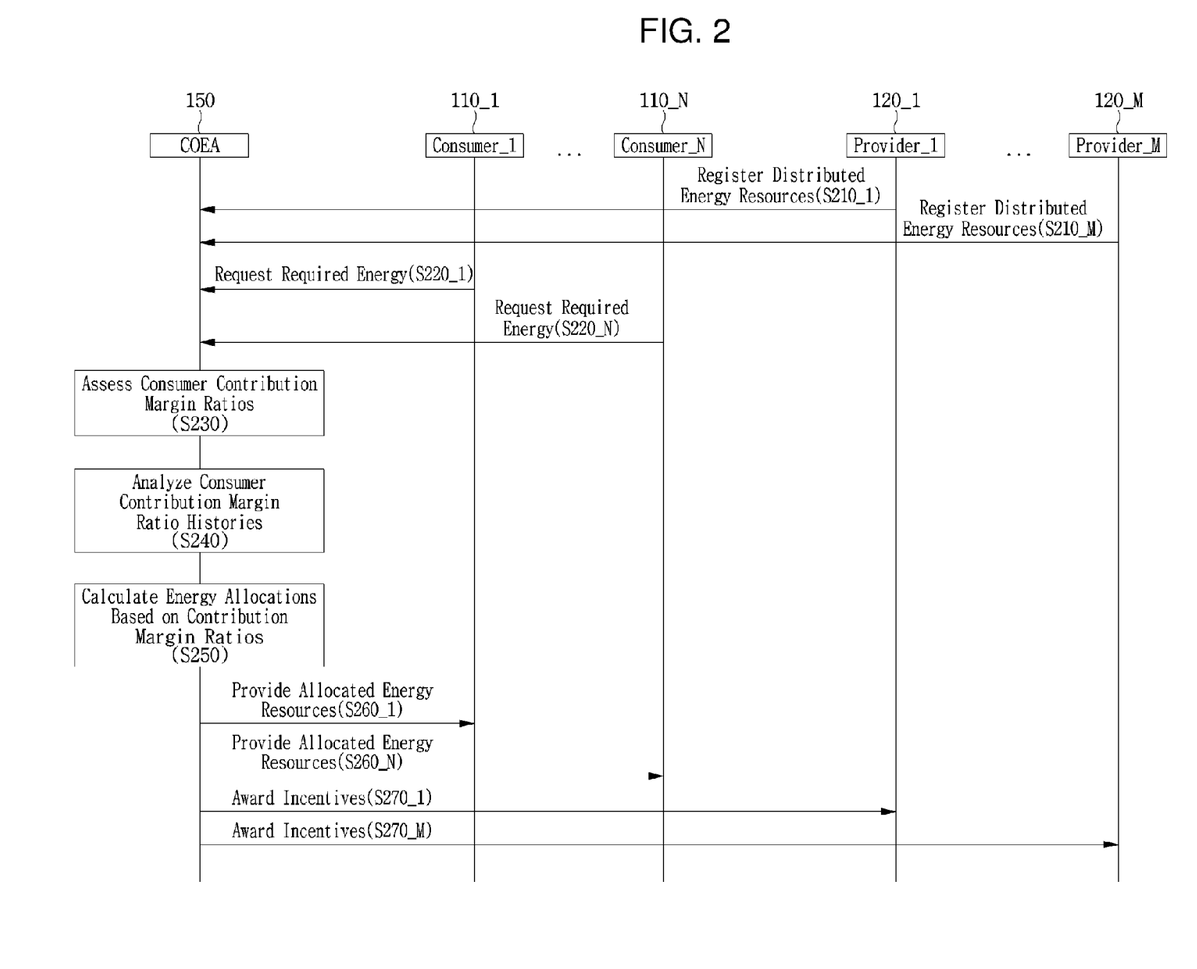
FIG. 2 is a diagram depicting a signal flow for a method for optimally allocating distributed energy resources according to the present disclosure.

FIG. 2 is a diagram depicting a signal flow for a method for optimally allocating distributed energy resources according to the present disclosure.

In steps S210_1, ..., S210_M, the one or more providers 120_1, 120_2, ..., 120_M may request registration of their available distributed energy resources, respectively to the COEA device 150. While not shown in FIG. 2, registration of the available distributed energy resources may be requested by support of the DER controllers 131_1, ..., 131_M, 133_1, ..., 133_M, 135_1, ..., 135_M, 137_1, ..., 137_M.

In steps S220_1, ..., S220_N, the one or more consumers 110_1, 110_2, ..., 110_N may request their required energy resources, respectively to the COEA device 150.

In step S230, the COEA device 150 may assess the contribution margin ratio of each of the one or more consumers 110_1, 110_2, ..., 110_N that have transmitted the required energy resource requests. Examples of assessing a consumer margin ratio will be described later in detail.

In step S240, the COEA device 150 may profile the assessed consumer margin ratios as history information, and analyze the history information. Profiling the results of assessing contribution margin ratios may include generation of a table or list including information about the amounts of energy resources requested by the consumers, the contribution margin ratios of the consumers, and time information.

In step S250, the COEA device 150 may calculate the amounts of energy resources to be allocated to the one or more consumers 110_1, 110_2, ..., 110_N that have requested their required energy resources based on the contribution margin ratios of the one or more consumers 110_1, 110_2, ..., 110_N (i.e., an energy allocation amount for each contribution margin ratio). For example, the COEA device 150 may determine an optimal energy allocation amount for each consumer in consideration of the amount of available distributed energy resources and the amount of required energy resources, and provide energy resources to the consumer according to the contribution margin ratio of the consumer. Examples of calculating an energy allocation amount for each contribution margin ratio will be described later in detail.

In steps S260_1, ..., S260_N, the COEA device 150 may provide energy resources to each of the one or more consumers 110_1, 110_2, ..., 110_N according to the calculated energy allocation amount for each contribution margin ratio.

In steps S270_1, ..., S270_M, the COEA device 150 may award incentive points to each of the one or more providers 120_1, 120_2, ..., 120_M according to the contribution degree of the provider to providing energy resources. These incentive points may serve as one of a plurality of factors that determine the contribution margin ratio of a consumer in a situation or at a time in which the provider later operates as the consumer.

Figure 3:
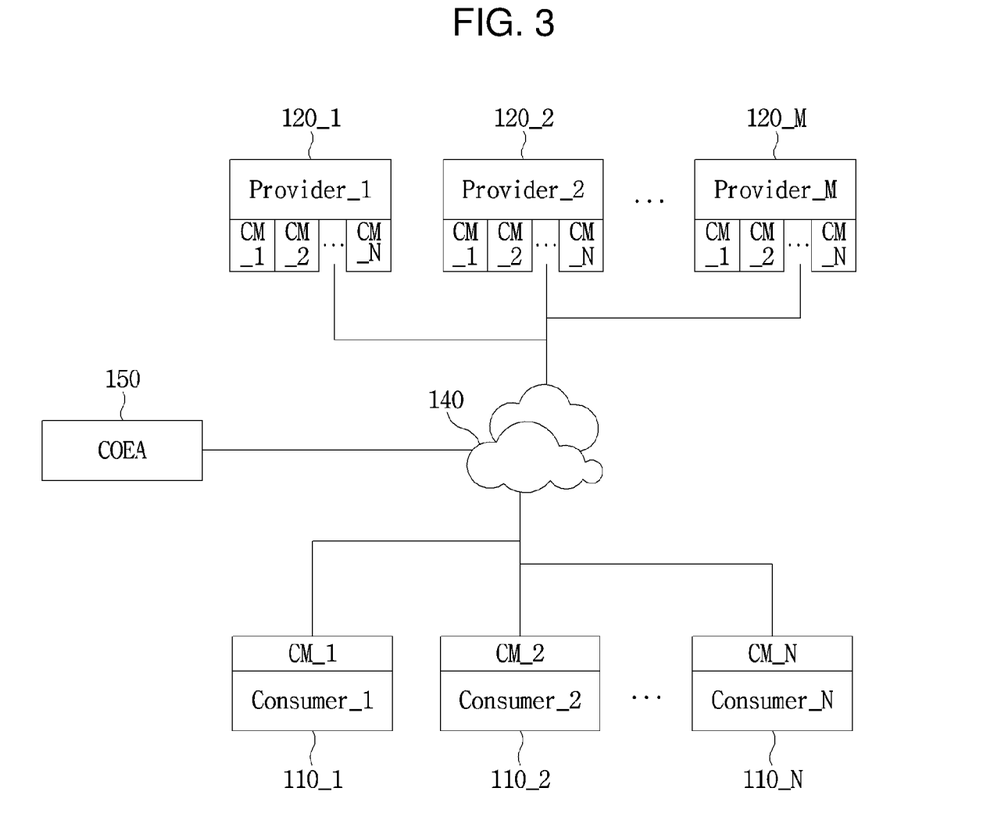
FIG. 3 is a diagram depicting exemplary allocation of distributed energy resources based on a contribution margin ratio according to the present disclosure.

FIG. 3 is a diagram depicting exemplary allocation of distributed energy resources based on a contribution margin ratio according to the present disclosure.

In the example of FIG. 3, it is assumed that the contribution margin ratios of the one or more consumers 110_1, 110_2, ..., 110_N are CM_1, CM_2, ..., CM_N, respectively. The contribution margin ratios may be determined by the COEA device 150. More specifically, the contribution margin ratio of each consumer may be profiled, kept, and managed as history information by the COEA device 150.

The COEA device 150 may analyze the contribution margin ratios of the one or more consumers 110_1, 110_2, ..., 110_N in consideration of the amounts of energy resources required for the consumers, and determine optimal energy resource allocation amounts for the one or more providers 120_1, 120_2, ..., 120_M according to the amounts of the required energy resources. Specifically, in consideration of the contribution margin ratio of each consumer, the COEA device 150 may allocate energy resource amounts corresponding to the contribution margin ratio to the one or more providers 120_1, 120_2, ..., 120_M.

More specifically, the COEA device 150 may allocate a part of the amount of energy provided by each provider to a specific consumer according to the ratio of the contribution margin ratio of the specific consumer to the sum of the contribution margin ratios of all consumers.

For example, if the contribution margin ratio of consumer_1 is CM_1, as much energy resources as CM_1/(CM_1+CM_2+ ... +CM_N) out of the total energy resources of provider_1, as much energy resources as CM_1/(CM_1+CM_2+ ... +CM_N) out of the total energy resources of provider_2, ..., as much energy resources as CM_1/(CM_1+CM_2+ ... +CM_N) out of the total energy resources of provider_M may be allocated to consumer_1.

If the contribution margin ratio of consumer_2 is CM_2, as much energy resources as CM_2/(CM_1+CM_2+ ... +CM_N) out of the total energy resources of provider_1, as much energy resources as CM_2/(CM_1+CM_2+ ... +CM_N) out of the total energy resources of provider_2, ..., as much energy resources as CM_2/

(CM_1+CM_2+ . . . +CM_N) out of the total energy resources of provider_M may be allocated to consumer_2.

Likewise, if the contribution margin ratio of consumer_n is CM_n, as much energy resources as CM_n/(CM_1+CM_2+ . . . +CM_N) out of the total energy resources of provider_1, as much energy resources as CM_n/(CM_1+CM_2+ . . . +CM_N) out of the total energy resources of provider_2, . . . , as much energy resources as CM_n/(CM_1+CM_2+ . . . +CM_N) out of the total energy resources of provider_M may be allocated to consumer_n.

Figure 4:
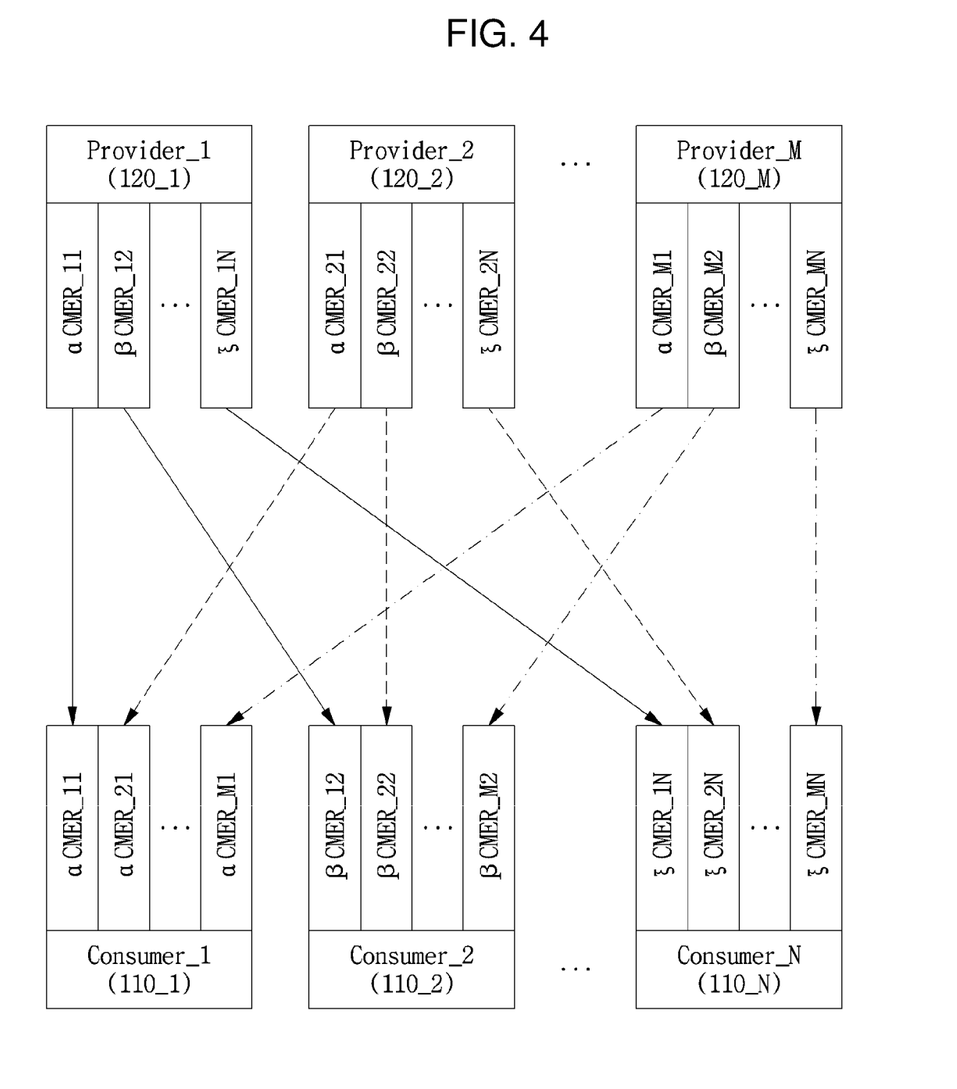
FIG. 4 is a diagram depicting additional exemplary allocation of distributed energy resources based on a contribution margin ratio according to the present disclosure.

FIG. 4 is a diagram depicting additional exemplary allocation of distributed energy resources based on a contribution margin ratio according to the present disclosure.

In the example of FIG. 3, when the energy resources of one provider, provider_m are allocated to N consumers, the amount of energy resources to be allocated to consumer_n is determined according to the ratio of the contribution margin ratio of consumer_n to the sum of the contribution margin ratios of the N consumers.

In the example of FIG. 4, energy resources are allocated to a consumer according to a weight factor determined based on the contribution margin ratio of the consumer.

In the example of FIG. 4, CMER represents contribution margin energy ratio, and CMER_mn represents a CMER considered when provider_m providers energy resources to consumer_n. For example, CMER_31 represents a CMER considered when provider_3 provides energy resources to consumer_1.

Herein, a weight factor may be applied to energy resources that each provider provides to each consumer. For example, let a weight factor for consumer_n be denoted by ω_n. Then, the weight factor for consumer_n(ω_n) may be determined based on the ratio of the contribution margin ratio of consumer_n. In the example of FIG. 4, it may be assumed that the weight factors ω_n of consumer_1, consumer_2, . . . consumer_n are determined to be α, β, . . . , ξ, respectively.

Therefore, a CMER considered when provider_1 provides energy resources to consumer_1 may be represented as αCMER_11, a CMER considered when provider_2 provides energy resources to consumer_1 may be represented as αCMER_21, and a CMER considered when provider_M provides energy resources to consumer_1 may be represented as αCMER_M1.

Further, a CMER considered when provider_1 provides energy resources to consumer_2 may be represented as βCMER_12, and a CMER considered when provider_2 provides energy resources to consumer_2 may be represented as βCMER_22. In the same manner, a CMER considered when provider_M provides energy resources to consumer_2 may be represented as βCMER_M2.

Further, a CMER considered when provider_1 provides energy resources to consumer_N may be represented as ξCMER_1N, and a CMER considered when provider_2 provides energy resources to consumer_N may be represented as ξCMER_2N. In the same manner, a CMER considered when provider_M provides energy resources to consumer_N may be represented as ξCMER_MN.

As described above, a CMER considered in providing energy resources to consumer_n by provider_m may be represented as ω_n*CMER_mn.

Now, a description will be given of a method for assessing the contribution margin ratio of a consumer, and a method for calculating the amount of energy resources to be allocated to a consumer in consideration of the contribution margin ratio of the consumer.

To optimally allocate distributed energy resources according to contribution margin ratios in a COEA system according to the present disclosure, providing or distribution of energy resources for the purpose of maximizing the sum of satisfactions of all consumers is considered. Maximization of the sum of satisfactions of all consumers may be represented by a social welfare model.

First, the satisfaction or satisfaction level of an individual consumer, consumer_i may be represented as a utility function, $U_i(E_i)$ where $E_i$ may be the amount of energy resources allocated to consumer_i. That is, if consumer_i receives as much energy resources as $E_i$, the satisfaction or satisfaction level of consumer_i may be represented as $U_i(E_i)$.

Then, the sum of satisfactions of all consumers may be expressed as [Equation 1].

$$\sum_{i \in J} U_i(E_i) \qquad \text{[Equation 1]}$$

where $J$ may represent a set of the indexes of all consumers, that is, $J = \{1, 2, \ldots, N\}$.

To achieve a value that maximizes the sum of the satisfactions of all consumers, expressed as [Equation 1], it is necessary to consider the amount of energy resources required for each consumer, and the amount of available energy of each provider. Accordingly, the sum of the satisfactions of all consumers may be expressed again as [Equation 2].

$$\max_E \sum_{i \in J} U_i(E_i) \text{ s.t. } 0 \le E_i \le r_i, \forall i \in J, \sum_{i \in J} E_i \le E \qquad \text{[Equation 2]}$$

where E may represent the sum of the remaining energy resources (i.e., available energy resources) of all providers, and $r_i$ may represent the amount of energy resources requested by consumer_i.

That is, as noted from [Equation 2], the amount $E_i$ of energy resources allocated to the individual consumer, consumer_i may have a value equal to or larger than 0, and equal to or less than the amount $r_i$ of energy resources requested by consumer_i. The sum of the amounts of energy resources allocated to all consumers may not exceed the amount E of the remaining energy resources.

For the utility function $U_i$, the following may be assumed:
$U_i$ is a non-negative real-valued function.
$U_i$ is a strictly increasing function for $E_i/r_i$. Herein, a strictly increasing function means a function f(x) in which f(a)<f(b) for two random values of x, a and b (a<b).
$U_i$ is a concave function for $E_i$. For example, a logarithmic function may be a concave function.
$U_i$ is proportional to $M_i^\eta$. Herein, $M_i^\eta$ is a value obtained by applying η defined as a weight factor to the contribution margin of consumer_i. Herein, the weight factor η may have a value larger than 0.

Further, to measure satisfaction of a consumer, a logarithmic utility function may be used in the present disclosure. For example, the utility function $U_i(E_i)$ for consumer_i may be expressed as [Equation 3].

$$U_i(E_i) = M_i^\eta \log\left(1 + \frac{E_i}{r_i}\right), \forall i \in J \qquad \text{[Equation 3]}$$

As noted from [Equation 3], the utility function $U_i(E_i)$ for consumer_i may be defined as the product between a logarithmic function for $(1+E_i/r_i)$ and a contribution margin ratio to which the weight factor $\eta$ is applied, $M_i^\eta$.

For all consumers, M is a contribution margin vector given as $M=\{M_1, M_2, \ldots, M_N\}$, r is a requested energy vector given as $r=\{r_1, r_2, \ldots, r_N\}$, and E is a consumer-allocated energy vector given as $E=\{E_1, E_2, \ldots, E_N\}$.

Accordingly, an energy allocation amount that maximizes the sum of the satisfactions of all consumers may be given by [Equation 4].

$$\max_E \sum_{i \in J} M_i^\eta \log\left(1 + \frac{E_i}{r_i}\right) \qquad \text{[Equation 4]}$$

$$s.t. \ 0 \leq E_i \leq r_i, \forall i \in J,$$

$$\sum_{i \in J} E_i \leq E.$$

Referring to [Equation 4], if the sum $\Sigma_{i \in J} r_i$ of the amounts of energy resources requested by all consumers is equal to or less than the sum E of the amounts of the remaining energy resources of all providers, the optimization problem may be easily solved. That is, if $\Sigma_{i \in J} r_i \leq E$, the sum of the satisfactions of all consumers may be maximized by allocating as much energy resources as $E_i(=r_i)$ to each consumer, consumer_i.

Meanwhile, if the sum $\Sigma_{i \in J} r_i$ of the amounts of energy resources requested by all consumers is greater than the sum E of the amounts of the remaining energy resources of all providers, the consumers may compete with each other. That is, $\Sigma_{i \in J} r_i > E$, the optimization problem may be solved by applying an additional condition.

It is assumed herein that the objective function $U_i(E_i)$ that should achieve a maximum or minimum value is a strictly concave function and all constraints are linear. A constraint means a condition that a solution for optimization should satisfy.

Therefore, a Karush-Kuhn-Tucker (KKT) condition may be given as [Equation 5] to [Equation 8]. The KKT condition is a condition added to achieve a solution for optimization for which the constraint of inequality exists in a Lagrange multiplier being a method for achieving a solution for optimization for which the constraint of equality exists.

$$\frac{M_i^\eta}{E_i^* + r_i} + \lambda_i - \mu_i - v = 0, \forall i \in J \qquad \text{[Equation 5]}$$

$$-E_i^* \leq 0, E_i^* - r_i \leq 0, \forall i \in J \qquad \text{[Equation 6]}$$

$$\sum_{i \in J} E_i^* - E = 0,$$

$$\lambda_i \geq 0, \mu_i \geq 0, \forall i \in J \qquad \text{[Equation 7]}$$

$$\lambda_i E_i^* = 0, \mu_i(E_i^* - r_i) = 0, \forall i \in J \qquad \text{[Equation 8]}$$

In [Equation 5] to [Equation 8], $\lambda$, $\mu$, and $v$ are predefined parameters for the KKT condition.

The KKT condition described by [Equation 5] to [Equation 8] may have an optimal solution because an objective function and an inequality constraint function are differentiable, the inequality constrain function is convex, and an equality constraint function is affine.

Therefore, for each consumer, consumer_i, an optimal energy resource allocation amount $E_i^*$ may be determined by [Equation 9].

$$E_i^* = \begin{cases} \delta M_i^\eta - r_i, & \text{if } E_i^* > 0 \text{ and } E_i^* < r_i; \\ r_i, & \text{if } E_i^* \geq r_i; \\ 0, & \text{otherwise,} \end{cases} \qquad \text{[Equation 9]}$$

where $\delta$ may be defined as a value predetermined in consideration of the amount of energy resources, a production plan, and so on.

Thus, an optimal energy allocation vector $E^*$ for all consumers may be determined by $E^*=\{E_i^* | i \in J\}$.

According to the examples of the present disclosure as described above, when a consumer requests required energy resources to a provider, an optimal energy resource allocation amount may be determined according to the contribution margin ratio of the consumer. Further, incentive points may be awarded to a provider that provides energy resources according to the contribution degree of the provider to providing energy resources. Consequently, available distributed energy resources may be efficiently used, and the supply and demand of distributed energy resources may be managed stably and efficiently.

An additional example of the present disclosure for considering adjacency in determining the contribution margin ratio of a consumer will be described below.

Figure 5:
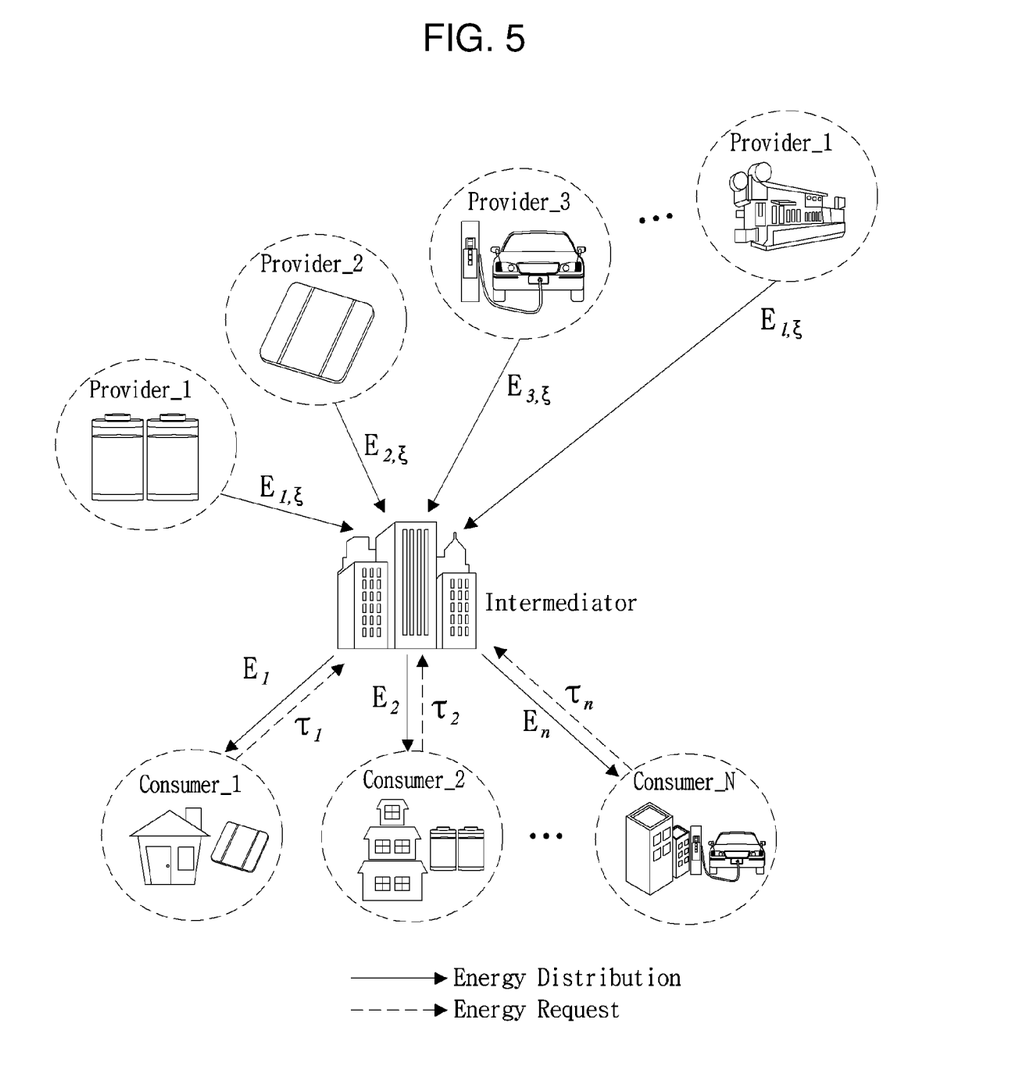
FIG. 5 is a diagram depicting an exemplary energy optimization management system according to the present disclosure.

FIG. 5 is a diagram depicting an exemplary energy optimization management system according to the present disclosure.

The example of FIG. 5 may correspond to, for example, an energy optimization management system in a smart grid infrastructure. In a method for optimally allocating energy by giving priority to an energy provider adjacent to an energy requesting user (i.e., a consumer) in the energy optimization management system of the present disclosure, if there is surplus energy of an energy provider, a smart grid closest to a user may allocate energy to the energy requesting user with priority in order to maximize user satisfaction.

In the example of FIG. 5, an intermediator between energy providers (i.e., provider_1, provider_2, provider_3, . . . , provider_l) and energy requesting users (i.e., consumer_1, consumer_2, . . . , consumer_n) may be an example of the COEA device 150 illustrated in the example of FIG. 1. This intermediator may analyze the satisfaction levels of consumers to receive energy, and allocate energy of energy providers to the consumers according to priority levels based on the distances to the consumers.

Accordingly, as an energy transmission distance decreases, energy loss also decreases. Thus, energy may be provided to consumers efficiently, and that at a lower price.

More specifically, if the satisfaction of consumer_i is expressed as the utility function $U_i(E_i)$, [Equation 10] may be presented, similarly to [Equation 2].

$$\max_E \Sigma_{i \in I} U_i(E_i) \ s.t. \ 0 \leq E_i \leq \tau_i, \forall i \in I, \Sigma_{i \in I} E_i \leq E \qquad \text{[Equation 10]}$$

where $I=\{1, 2, \ldots, N\}$, which is a set of the indexes of all consumers.

An adjacent priority vector, $\zeta$ may be defined as $\zeta=\{\zeta_1, \zeta_2, \ldots, \zeta_l\}$. An adjacent priority vector value, $\zeta_i$ may mean an energy providing distance between provider_i and consumer_i. Therefore, as the distance between provider_i and consumer_i is smaller, the adjacent priority value $\zeta_i$ may have a greater value.

Further, an energy request vector, $\tau$ may be defined as $\tau=\{\tau_1, \tau_2, \ldots, \tau_n\}$. Consumer_i may request as much energy as $\tau_i$ to the intermediator.

A consumer-distributed energy vector E may be defined as $E=\{E_1, E_2 \ldots, E_n\}$. The sum of all $E_i$ values may not exceed the sum E of the amounts of the remaining energy of all providers.

In an objective function, a diminishing marginal utility function may be used to represent user satisfaction. Therefore, a utility function for consumer_i may be expressed as [Equation 11], and optimal energy management based on priority may be expressed as [Equation 12].

$$U_i(E_i) = \zeta_i^{\frac{1}{\omega}} \log\left(1 + \frac{E_i}{\omega \tau_i}\right), \forall_i \in I \quad \text{[Equation 11]}$$

$$\max_E \sum_{i \in I} \zeta_i^{\frac{1}{\omega}} \log\left(1 + \frac{E_i}{\omega \tau_i}\right) \quad \text{[Equation 12]}$$
$$s.t. \ 0 \leq E_i \leq \tau_i, \forall_i \in I,$$
$$\sum_{i \in I} E_i \leq E$$

In [Equation 11] and [Equation 12], ω represents a weight factor for an adjacent priority level based on the distance between a provider and a consumer, and may have a value exceeding 0. That is, as the distance is smaller, ω may have a smaller value, and as the distance is greater, ω may have a greater value.

This objective function is strictly concave, and all constraints are linear. Thus, in order to satisfy the KKT condition, conditions described by [Equation 13] to [Equation 16] may be satisfied.

$$\nabla f(x^*) + \sum_{i=1}^m \lambda_i \nabla g_i(x^*) + \sum_{j=1}^l v_j \nabla h_j(x^*) = 0 \quad \text{[Equation 13]}$$

$$g_i(x^*) \leq 0, h_j(x^*) = 0 \quad \text{[Equation 14]}$$

$$\lambda_i = 0 \quad \text{[Equation 15]}$$

$$\lambda_i g_i(x^*) = 0 \quad \text{[Equation 16]}$$

In [Equation 13] to [Equation 16], constraint vectors g(x) and h(x) are column vectors as defined by [Equation 17].

$$g(x) = \begin{bmatrix} g_1(x) \\ g_2(x) \\ \vdots \\ g_m(x) \end{bmatrix}, h(x) = \begin{bmatrix} h_1(x) \\ h_2(x) \\ \vdots \\ h_l(x) \end{bmatrix} \quad \text{[Equation 17]}$$

For m inequality constraints, m Lagrange multipliers $\lambda_i$ may be defined. For l equality constraints, l KKT constraints $v_i$ may be defined. This may be given as [Equation 18].

$$\lambda = \begin{bmatrix} \lambda_1 \\ \lambda_2 \\ \vdots \\ \lambda_m \end{bmatrix}, v = \begin{bmatrix} v_1 \\ v_2 \\ \vdots \\ v_l \end{bmatrix} \quad \text{[Equation 18]}$$

where $\nabla f(x^*)$ may be represented as [Equation 19].

$$\nabla f(x^*) = \nabla U_i(E_i^*), \quad \text{[Equation 19]}$$
$$= \zeta_i^{\frac{1}{\omega}} \cdot \left(\frac{\omega \tau_i}{\omega \tau_i + E_i^*}\right) \cdot \left(\frac{\omega \tau_i + E_i^*}{\omega \tau_i}\right)',$$

-continued
$$= \zeta_i^{\frac{1}{\omega}} \cdot \left(\frac{\omega \tau_i}{\omega \tau_i + E_i^*}\right) \cdot \frac{1}{\omega \tau_i},$$
$$= \frac{\zeta_i^{\frac{1}{\omega}}}{\omega \tau_i + E_i^*}$$

$\sum_{i=1}^m \lambda_i \nabla g_i(x^*)$ of [Equation 13] may be represented as [Equation 20].

$$\sum_{i=1}^m \lambda_i \nabla g_i(x^*) = -\lambda_i + \overline{\lambda}_i \quad \text{[Equation 20]}$$

Further, $\sum_{j=1}^l v_j \nabla h_j(x^*)$ of [Equation 13] may be represented as [Equation 21].

$$\sum_{i=1}^m v_j \nabla h_j(x^*) = v \quad \text{[Equation 21]}$$

[Equation 12] may also be changed from a problem of achieving a maximum value to a problem of achieving a minimum value as given by [Equation 22].

$$\max_E \sum_{i \in I} \zeta_i^{\frac{1}{\omega}} \log\left(1 + \frac{E_i}{\omega \tau_i}\right) = \quad \text{[Equation 22]}$$
$$-\min_E \sum_{i \in I} \zeta_i^{\frac{1}{\omega}} \log\left(1 + \frac{E_i}{\omega \tau_i}\right)$$

Achieving the solution of [Equation 22], satisfying the condition of [Equation 13] may be expressed as [Equation 23].

$$\frac{\zeta_i^{\frac{1}{\omega}}}{\omega \tau_i + E_i^*} + \lambda_i - \overline{\lambda}_i - v = 0, \forall_i \in I \quad \text{[Equation 23]}$$

The condition of [Equation 14] may be expressed as [Equation 24].

$$-E_i^* \leq 0, E_i^* - \tau_i \leq 0, \forall_i \in I, \quad \text{[Equation 24]}$$
$$\sum_{i \in I} E_i^* - E = 0$$

The condition of [Equation 15] may be represented as [Equation 25].

$$\lambda_i \geq 0, \overline{\lambda}_i \geq 0, \forall_i \in I \quad \text{[Equation 25]}$$

The condition of [Equation 16] may be represented as [Equation 26].

$$\lambda_i E_i^* = 0, \overline{\lambda}_i(E_i^* - \tau_i) = 0, \forall_i \in I \quad \text{[Equation 26]}$$

Therefore, since the objective function is differentiable, the inequality constraint function is convex, and the equality constraint function is affine, the KKT conditions may have optimal solutions.

In order to satisfy the condition of [Equation 25], three cases may be considered for $E_i$.

One of the cases is that $0 \leq E_i^* \leq \tau_i$. In this case, $\lambda_i = 0$ and $\overline{\lambda}_i = 0$. If these values are substituted in [Equation 23], [Equation 27] may result $$\frac{\zeta_i^{\frac{1}{\omega}}}{\omega \tau_i + E_i^*} - v = 0, \quad \text{[Equation 27]}$$

-continued $$\frac{\zeta_i^{\frac{1}{\omega}}}{\omega\tau_i + E_i^*} = v,$$

$$\omega\tau_i + E_i^* = \frac{\zeta_i^{\frac{1}{\omega}}}{v},$$

$$E_i^* = \frac{\zeta_i^{\frac{1}{\omega}}}{v} - \omega\tau_i$$

Another case is that $E_i^* = \tau_i$. In this case, $\lambda_i = 0$ in [Equation 26]. [Equation 28] may be obtained by substituting the value in [Equation 23].

[Equation 28]

$$\frac{\zeta_i^{\frac{1}{\omega}}}{\omega\tau_i + \tau_i} - \overline{\lambda_i} - v = 0,$$

$$\frac{\zeta_i^{\frac{1}{\omega}}}{(\omega+1)\tau_i} - \overline{\lambda_i} - v = 0,$$

$$\zeta_i^{\frac{1}{\omega}} = (\omega+1)\tau_i\overline{\lambda_i} + (\omega+1)\tau_i v,$$

$$\frac{\zeta_i^{\frac{1}{\omega}}}{v} = \frac{(\omega+1)\tau_i\overline{\lambda_i}}{v} + (\omega+1)\tau_i,$$

$$\frac{\zeta_i^{\frac{1}{\omega}}}{v} - \omega\tau_i = \frac{(\omega+1)\tau_i\overline{\lambda_i}}{v} + \tau_i,$$

$$= E_i^* \geq 0$$

The other case is that $E_i^* = 0$. In this case, $\overline{\lambda_i} = 0$ in [Equation 26]. [Equation 29] may be obtained by substituting the value in [Equation 23].

[Equation 29]

$$\frac{\zeta_i^{\frac{1}{\omega}}}{\omega\tau_i} + \lambda_i - v = 0,$$

$$\frac{\zeta_i^{\frac{1}{\omega}}}{\omega\tau_i} + \lambda_i = v,$$

$$\zeta_i^{\frac{1}{\omega}} + \omega\tau_i\lambda_i = \omega\tau_i v,$$

$$\frac{\zeta_i^{\frac{1}{\omega}}}{v} + \frac{\omega\tau_i\lambda_i}{v} = \omega\tau_i,$$

$$\frac{\zeta_i^{\frac{1}{\omega}}}{v} - \omega\tau_i = \frac{\omega\tau_i\lambda_i}{v},$$

$$= E_i^* \leq 0$$

[Equation 27], [Equation 28], and [Equation 29] may be summarized as [Equation 30].

[Equation 30]

$$E_i^* = \begin{cases} \zeta_i^{1/\omega}/v - \omega\tau_i & , \quad 0 < E_i^* < \tau_i; \\ \tau_i & , \quad E_i^* \geq \tau_i; \\ 0 & , \quad \text{otherwise.} \end{cases}$$

[Equation 30] may mean optimal energy distribution based on priority, which maximizes the satisfaction of consumer_i from the perspective of the intermediator. If the amount of energy provided by provider_i is less than the amount of energy requested by consumer_i, the intermediator may distribute as much energy as $\zeta_i^{1/\omega}/v - \omega\tau_i$ to consumer_i. On the other hand, if as much energy as or more energy than requested is available, as much energy as requested by consumer_i may be provided.

As described above, the example of assigning a weight factor ω based on the distance between a provider and a consumer may correspond to assessment of a contribution margin ratio based on a distance among various examples of the present disclosure.

That is, $\zeta_i^{1/\omega}$ of [Equation 30] may be an example of $M_i^n$ of [Equation 9], and 1/v of [Equation 30] may be an example of δ of [Equation 9].

Further, application of a distance-based weight factor ω to the amount $\tau_i$ of energy resources requested by consumer_i in [Equation 30] may be an example of considering an additional weight factor, compared to dealing with the amounts of energy resources requested by all consumers equally without applying a weight factor η to the amount $\tau_i$ of energy resources requested by consumer_i, as described in [Equation 9].

Figure 6:
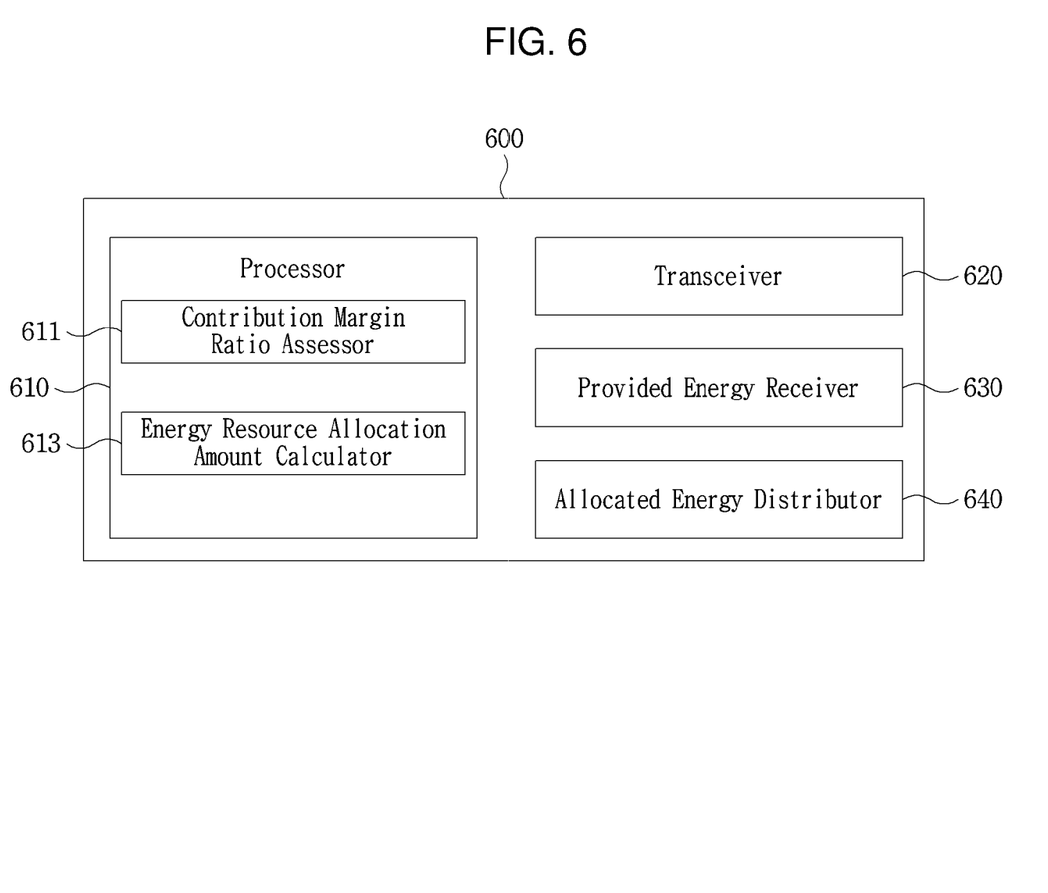
FIG. 6 is a block diagram of an energy allocation apparatus according to the present disclosure.

FIG. 6 is a block diagram of an energy allocation apparatus according to the present disclosure.

An energy allocation apparatus 600 may correspond to the COEA device 150 illustrated in FIGS. 1, 2, and 3, or the intermediator device illustrated in FIG. 5.

The energy allocation apparatus 600 may include a processor 610, a transceiver 620, a provided energy receiver 630, and an allocated energy distributor 640.

The processor 610 may determine the amounts of available energy resources of one or more providers, received through the transceiver 620.

The processor 610 may also determine the amounts of energy resources requested by one or more consumers, received through the transceiver 620.

A contribution margin ratio assessor 611 of the processor 610 may assess the contribution margin ratio of each of the one or more consumers.

An energy resource allocation amount calculator 613 of the processor 610 may calculate the amount of energy resources to be allocated to each of the one or more consumers based on the assessed contribution margin ratio of the consumer.

The processor 610 may distribute energy resources to each of the one or more consumers based on the calculated energy resource allocation amount for the consumer.

Accordingly, the energy allocation apparatus 600 may transmit energy resources to each of the one or more consumers through the allocated energy distributor 640. The energy allocation apparatus 600 may store energy resources provided by one or more providers in the provided energy resource receiver 630 and transmit the stored energy resources to consumers through the allocated energy distributor 640. Or the energy allocation apparatus 600 may control or intermediate only paths in which providers transmit energy resources to consumers, instead of storing and then distributing provided energy resources.

While not shown in FIG. 6, the energy allocation apparatus 600 may include a memory or database, or may be connected to an external memory or database. The memory or database may store results of profiling the contribution margin ratios of consumers and keeping history information about the consumers, and may store and keep incentive points corresponding to energy resources provided by providers.

Figure 7:
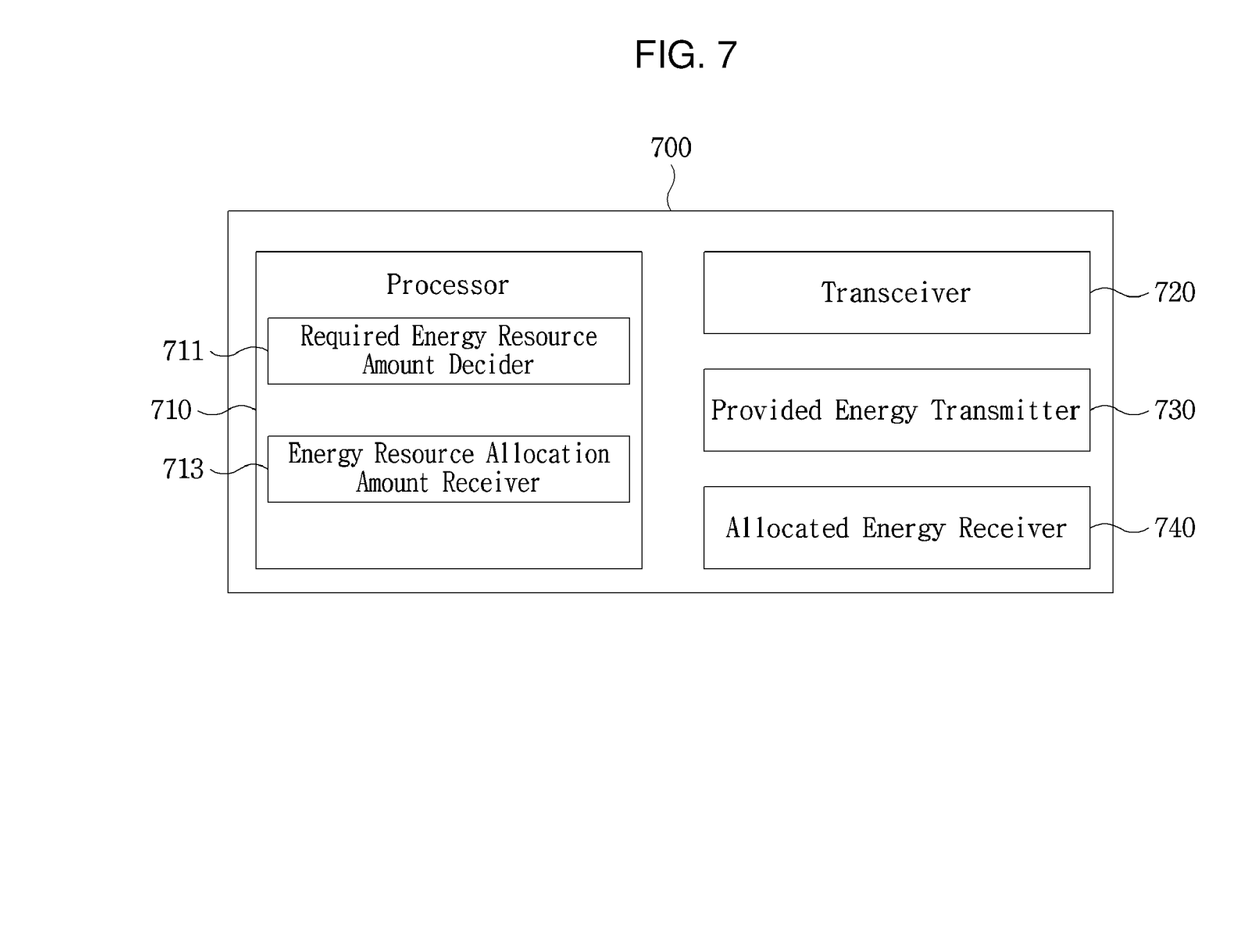
FIG. 7 is a block diagram of a consumer device according to the present disclosure.

FIG. 7 is a block diagram of a consumer/provider device according to the present disclosure.

A consumer/provider device 700 may correspond to a consumer device illustrated in FIGS. 1 to 5, or a provider device illustrated in FIGS. 1 to 5 under circumstances. For the convenience of description, the consumer/provider device 700 is referred to as the consumer device 700, not excluding functions or a configuration as a provider device.

The consumer device 700 may include a processor 710, a transceiver 720, a provided energy transmitter 730, and an allocated energy receiver 740.

A required energy resource amount decider 711 of the processor 710 may determine the amount of energy resources requested by the consumer device 700, generate information indicating the determined amount of requested energy resources, and transmit the information to the energy allocation apparatus 600 through the transceiver 720.

An energy resource allocation amount receiver 713 of the processor 710 may receive information about an energy resource allocation amount from the energy allocation apparatus 600 through the transceiver 720, and receive energy resources based on the energy resource allocation amount through the allocated energy receiver 740.

Meanwhile, if the consumer device 700 operates as a provider device, the provided energy transmitter 730 may transmit available energy resources to the energy allocation apparatus 600 or another consumer device. Further, the consumer device 700 may generate information indicating the amount of available energy resources, and transmit the information to the energy allocation apparatus 600 through the transceiver 720.

While the afore-described exemplary methods of the present disclosure have been described as a series of operations for simplicity of description, this does not limit the sequence of steps. In some embodiments, steps may be performed at the same time or in a different sequence. All of the exemplary steps are not always necessary to implement the method proposed by the present disclosure.

Various embodiments of the present disclosure are intended to describe main aspects of the present disclosure, not enumerating all possible combinations. The descriptions of the various embodiments may be applied independently or in a combination of two or more of the embodiments.

Various embodiments of the present disclosure may be achieved by hardware, firmware, software, or a combination thereof. In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The present disclosure includes software or machine-executable instructions (e.g., an operating system (OS), an application, firmware, a program, etc.) for executing the method of the present disclosure in a device or a computer, and a non-transitory computer-readable medium storing the software or instructions that can be executed in a device or a computer.

The invention claimed is:

1. A method for distributing energy resources in a distributed energy resource system, the method comprising:
receiving information about the amount of available energy resources from each of one or more providers;
receiving information about the amount of required energy resources from each of one or more consumers;
assessing a contribution margin ratio for each of the one or more consumers;
calculating an energy resource allocation amount for each of the one or more consumers based on the assessed contribution margin ratio; and
distributing energy resources to each of the one or more consumers based on the calculated energy resource allocation amount.

2. The method according to claim 1, wherein the contribution margin ratio of one consumer is a ratio of a contribution margin of the consumer to a total contribution margin of the one or more consumers.

3. The method according to claim 2, wherein the contribution margin of the consumer is determined based on at least one of the amount of energy resources provided by the consumer, the amount of energy resources used by another consumer among the energy resources provided by the consumer, distances between the consumer and the one or more providers, or a distance between the consumer and another consumer.

4. The method according to claim 3, wherein the calculation of an energy resource allocation amount comprises calculating the energy resource allocation amount for each of the one or more consumers, the energy resource allocation amount maximizing satisfaction levels of all of the one or more consumers.

5. The method according to claim 1, wherein a satisfaction level of an $i^{th}$ consumer among the one or more consumers is calculated by $$U_i(E_i) = \zeta_i^{\frac{1}{\omega}} \log\left(1 + \frac{E_i}{\omega \tau_i}\right)$$

where $U_i(E_i)$ represents the satisfaction level of the $i^{th}$ consumer when the $i^{th}$ consumer receives as much energy resources as $E_i$, $M_i^\eta$ represents a contribution margin of the $i^{th}$ consumer, $\eta$ represents a weight factor, and $r_i$ represents the amount of energy resources requested by the $i^{th}$ consumer.

6. The method according to claim 5, wherein if the calculated energy resource allocation amount for the $i^{th}$ consumer is $E_i^*$, and $0 < E_i^* < r_i$, $E_i^* = \delta M_i^\eta - r_i$ and $\delta$ is a predetermined value.

7. The method according to claim 6, wherein if $E_i^* \geq r_i$, an optimal energy resource allocation amount for the $i^{th}$ consumer is $r_i$.

8. The method according to claim 1, wherein a satisfaction level of an $i^{th}$ consumer among the one or more consumers is calculated by $$U_i(E_i) = \zeta_i^{\frac{1}{\omega}} \log\left(1 + \frac{E_i}{\omega \tau_i}\right)$$

where $U_i(E_i)$ represents the satisfaction level of the $i^{th}$ consumer when the $i^{th}$ consumer receives as much energy resources as $E_i$, $\zeta_i^{1/\omega}$ represents a contribution margin of the $i^{th}$ consumer, determined in consideration of an adjacent proximity level of the $i^{th}$ consumer, $\omega$ represents a weight factor based on a distance between the $i^{th}$ consumer and another consumer, and $\tau_i$ represents the amount of energy resources requested by the $i^{th}$ consumer.

9. The method according to claim 8, wherein if the calculated energy resource allocation amount for the $i^{th}$ consumer is $E_i^*$, and $0 < E_i^* < \tau_i$, $E_i^* = \zeta_i^{1/\omega}/v - \omega\tau_i$ and $v$ is a predetermined value.

10. The method according to claim 9, wherein if $E_i^* \geq \tau_i$, an optimal energy resource allocation amount for the $i^{th}$ consumer is $\tau_i$.

* * * * *